United States Patent [19]
Kemner et al.

[11] Patent Number: 5,931,875
[45] Date of Patent: Aug. 3, 1999

[54] SYSTEM AND METHOD FOR MANAGING A FLEET OF MOBILE MACHINES FOR DUMPING AT A PLURALITY OF DUMP POINTS

[75] Inventors: Carl A. Kemner; Craig L. Koehrsen; Jagannathan Sarangapani, all of Peoria, Ill.

[73] Assignee: Caterpillar Inc., Peoria, Ill.

[21] Appl. No.: 08/774,941

[22] Filed: Dec. 19, 1996

[51] Int. Cl.⁶ .............................. G05D 1/00; G01C 22/00
[52] U.S. Cl. ................................ 701/23; 701/23; 701/24; 701/50
[58] Field of Search .................................... 701/23, 50, 24; 340/988, 989, 990, 991, 992, 493, 994, 909; 180/167, 168; 318/587; 395/859

[56] References Cited

U.S. PATENT DOCUMENTS

| | | | |
|---|---|---|---|
| 4,950,118 | 8/1990 | Mueller et al. | 414/274 |
| 5,390,125 | 2/1995 | Sennott et al. | 364/449 |
| 5,445,347 | 8/1995 | Ng | 246/169 |
| 5,546,093 | 8/1996 | Gudat et al. | 342/357 |
| 5,586,030 | 12/1996 | Kemner et al. | 701/23 |
| 5,646,844 | 7/1997 | Gudat et al. | 701/208 |
| 5,742,915 | 4/1998 | Stafford | 701/35 |
| 5,752,207 | 5/1998 | Sarangapani | 701/26 |
| 5,787,378 | 7/1998 | Schricker | 701/50 |
| 5,806,016 | 9/1998 | Henderson et al. | 701/207 |

Primary Examiner—William A. Cuchlinski, Jr.
Assistant Examiner—Tim Wyckoff
Attorney, Agent, or Firm—James R. Yee

[57] ABSTRACT

The invention is a system and method for managing a resource having a stop point. Each of at least one mobile machine includes a queue manager adapted to generate a queue position request as the mobile machine approaches the resource. A resource manager is adapted to establish a queue to control access to the resource. After receiving the queue position request from the approaching mobile machine, the resource manager generates a queue position and sends it to the mobile machine. The resource manager then determines the next stop point to be accessed. When the resource is available to receive another mobile machine, the resource manger directs the first mobile machine in the selected queue to proceed to access the stop point.

35 Claims, 6 Drawing Sheets

Fig_3.

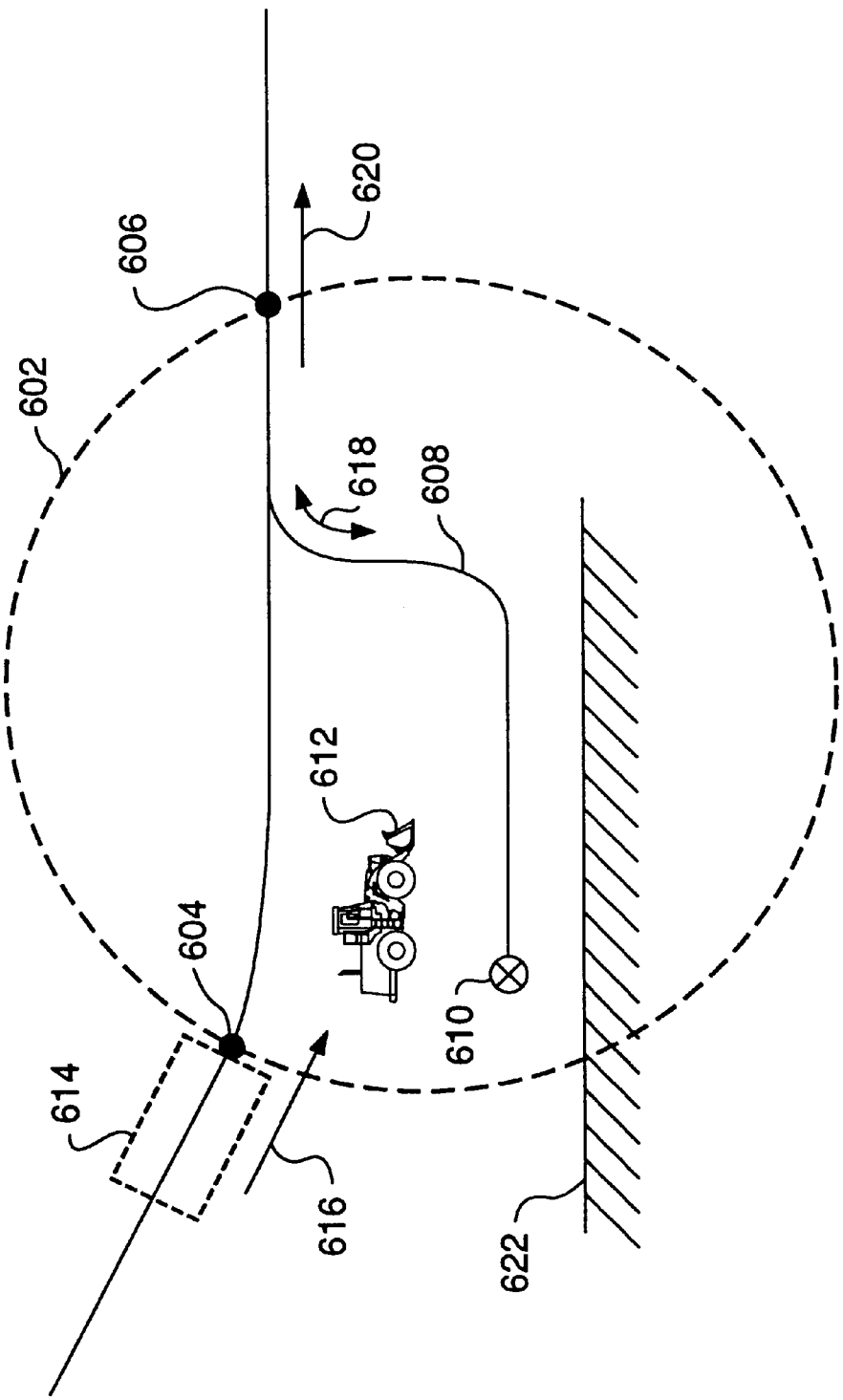

5,931,875

SYSTEM AND METHOD FOR MANAGING A FLEET OF MOBILE MACHINES FOR DUMPING AT A PLURALITY OF DUMP POINTS

TECHNICAL FIELD

This invention relates generally to a system and method for managing resources in a mobile machine system and, more particularly, to a system and method for managing access to a resource having a stop point, such as a plurality of dump points, by a fleet of mobile machines.

BACKGROUND ART

Caterpillar Inc. of Peoria, Ill., manufactures off-road mining mobile machines. For example, the Caterpillar 777C is an off-road mining truck. The off-road mining trucks may be autonomously or manually controlled. For example, in commonly owned U.S. Pat. No. 5,390,125, Kyrtsos et al disclose an autonomous mobile machine system for use with a mining mobile machine such as the 777C truck. Such an autonomous mobile machine system may be used, for example, to implement an autonomous mining operation. For example, a plurality of autonomous dump trucks can haul rock from an excavation site to a crusher site in an open pit mining operation.

In addition, in commonly owned U.S. Pat. No. 5,586,030 Kemner et al disclose a system using a queuing technique to manage a single input, fixed position resource such as a wheel loader. However, in a mining system, there are several resources such as progressive dump resources, which do not have a fixed position stop point. In a progressive dump resource, such as a windrow dump, the stop point is dynamically changing dependent upon the desired configuration of the windrow dump.

The present invention is directed to overcoming one or more of the problems as set forth above.

DISCLOSURE OF THE INVENTION

In one aspect of the present invention, a system for managing a resource shared by at least one mobile machine is provided. The system includes a queue manager on each mobile machine adapted to generate a queue position request signal. The system also includes a resource manager adapted to establish and control a queue to control access to the resource. The resource manager also is adapted to determine the location of a stop point as a function of the resource configuration.

In another aspect of the present invention, a method for managing a resource shared by at least one mobile machine is provided. The method includes the steps of establishing and controlling a queue to control access to the resource, and determining a stop point for a mobile machine in a first position of the queue.

BRIEF DESCRIPTION OF THE DRAWINGS

FIG. 6 is a diagrammatic illustration of a high wall dump having one entry point, one dump row, one dump point, and one exit point.

BEST MODE FOR CARRYING OUT THE INVENTION

Figure 1:
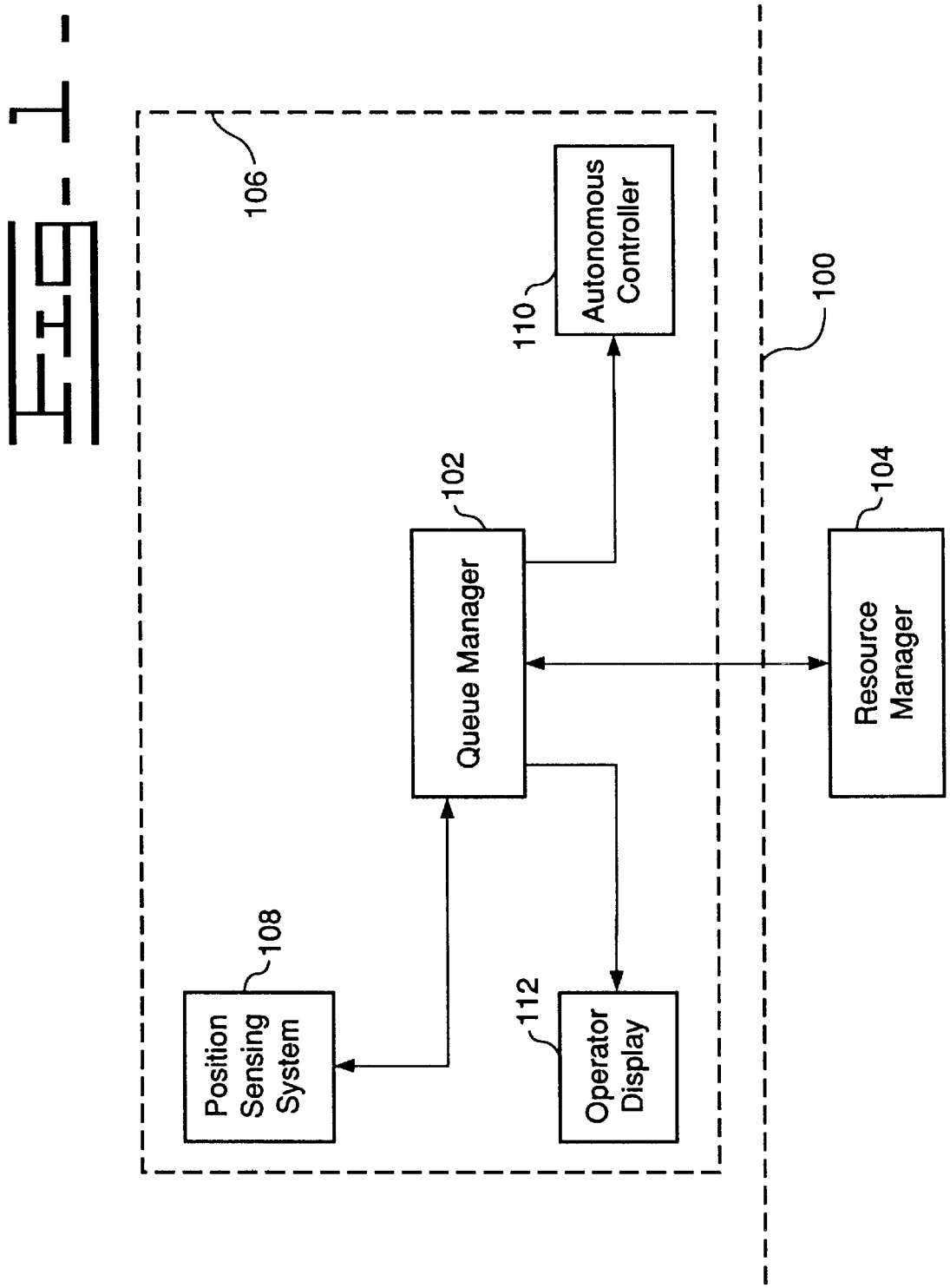
FIG. 1 is a high level block diagram illustrating an embodiment of the present invention.
Figure 2:
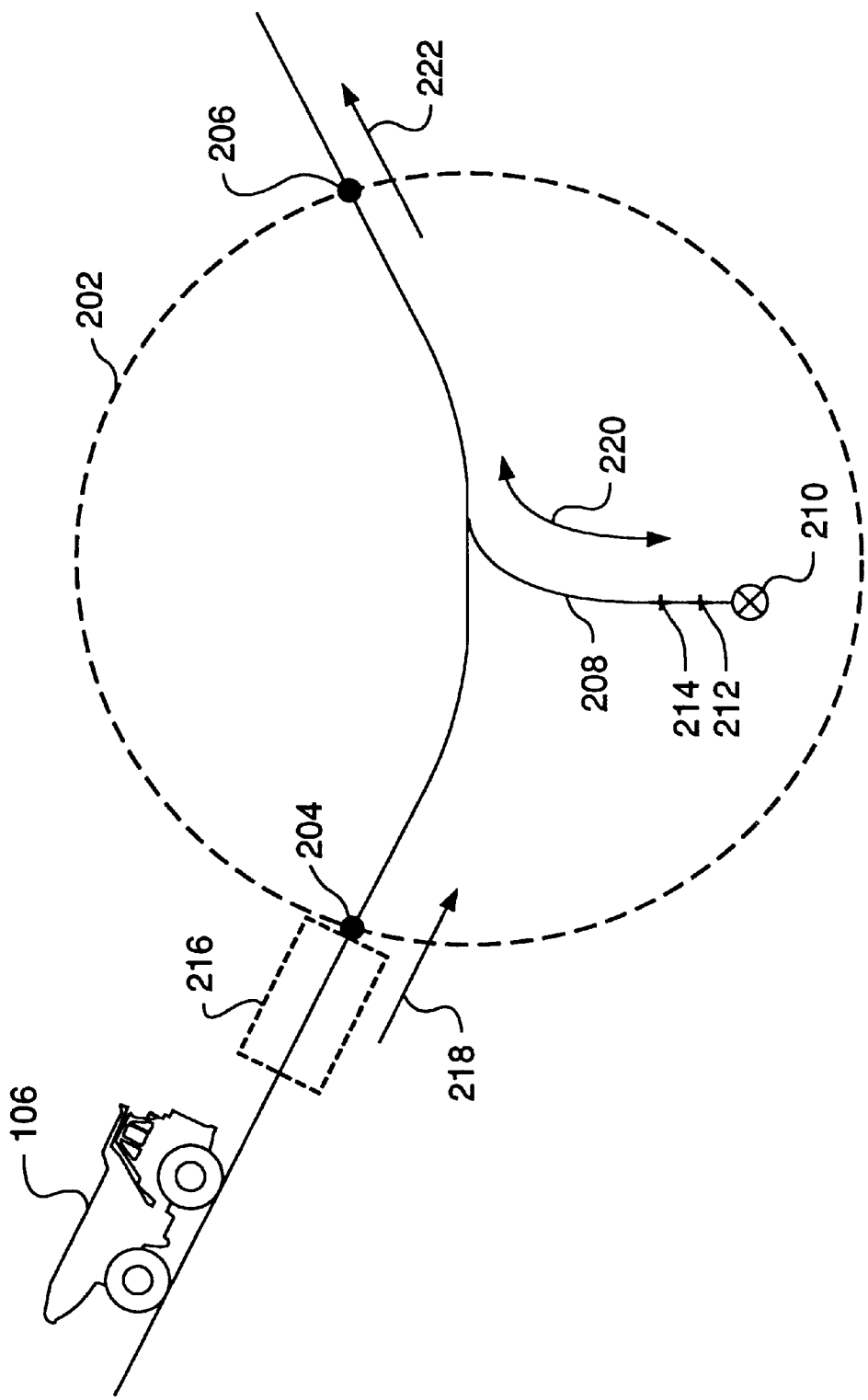
FIG. 2 is a diagrammatic illustration of a windrow dump having one entry point, one dump row, one dump point, and one exit point.

With reference to FIGS. 1 and 2, the present invention provides a system 100 for managing a resource 202 shared by at least one mobile machine 106. A resource manager 104 dynamically determines a stop point 210 for the mobile machine 106.

In the preferred embodiment, the resource 202 is a dump resource and the stop point 210 is a dump point, as explained below.

A queue manager 102 is located on each mobile machine 106. The queue manager 102 generates a queue position request signal when the mobile machine 106 approaches the resource 202.

The resource manager 104 establishes and controls a queue 216 to control access to the resource 202 in response to receiving the queue position request signal. The resource manager 104 also determines the dump point 210 for the mobile machine 106 in the first position of the queue 216, where the dump point 210 is a function of a configuration of the resource 202 (see below).

A position sensing system 108 determines the position of a predetermined point on the mobile machine 106. The position sensing system 108 may include a Global Positioning System (GPS), a laser positioning system, an inertial navigation unit, or any suitable system or combination thereof.

The system 100 may operate in an autonomous or manual mode. In the autonomous system embodiment, an autonomous controller 110 receives signals from the position sensing system 108 and the queue manager 102 and autonomously operates the mobile machine 106 along a predetermined path. In the manual system embodiment, an operator display 112 displays information to assist an operator during operation of the mobile machine 106.

In the preferred embodiment the resource 202 is a progressive dump resource such as a high wall dump or a windrow dump. The resource manager 104 controls the flow of mobile machines 106, such as dump trucks, through progressive dump resources at the work site, e.g., an open pit mining site. The resource manager 104 acts like a supervisor, controlling access to the progressive dump resource, determining where the appropriate dump point 210 is located, and tracking the progress of the mobile machines 106 as they pass through the resource 202. In the preferred embodiment, the resource manager 104 is located at a base station (not shown) near an open pit mining operation, and is a general purpose computer or workstation. The features of the resource manager 104 are embodied in software programmed into the computer.

With reference to FIG. 2 in the preferred embodiment, the progressive resource 202 is a windrow dump with one entry point 204, one exit point 206, at least one dump row 208, and at least one dump point 210 for each dump row 208. Arrows 218, 220, 222 indicate the direction or travel of mobile machines 106 in and out of the resource 202. Future dump points 212, 214 are determined using an incremental offset from the current dump point 210.

The resource manager 104 establishes a queue 216 for the entry point 204 to the resource 202, e.g., windrow dump. As mobile machines 106 approach the resource 202, the resource manager 104 assigns them a position within the queue 216.

When the dump row 208 is clear, the resource manager 104 determines a first future dump point 212 for the dump row 208. The first future dump point 212 is located at a predefined location on the dump row 208. The position of the first future dump point 212 is determined by the configuration of the resource 202. For example, in the preferred embodiment, future dump points 212,214 for the dump row 208 of FIG. 2 are determined by updating the current dump point 210 with an incremental offset.

After updating the dump point 210 to the first future dump point 212, the resource manager 104 communicates the first future dump point 212 to the first mobile machine 106 in the queue 216. The resource manager 104 then determines when the dump row 208 is clear. When the dump row 208 is clear, the resource manager 104 permits the first mobile machine 106 in the queue 216 to proceed to the first future dump point 212. The timing of the access to the dump row 208 is important to ensure that multiple mobile machines 106 do not conflict with each other as they move through the resource 202. The resource manager 104 determines the dump row 208 is clear by tracking the progress of the mobile machines 106 as they proceed through the resource 202. After permitting a mobile machine 106 to proceed, the resource manager 104 tracks the progress of the mobile machine 106 through the resource 202. Once the mobile machine 106 has left the resource 202, the resource manager 104 selects the next appropriate mobile machine 106 in the queue 216 to allow access to the resource 202.

Figure 3:
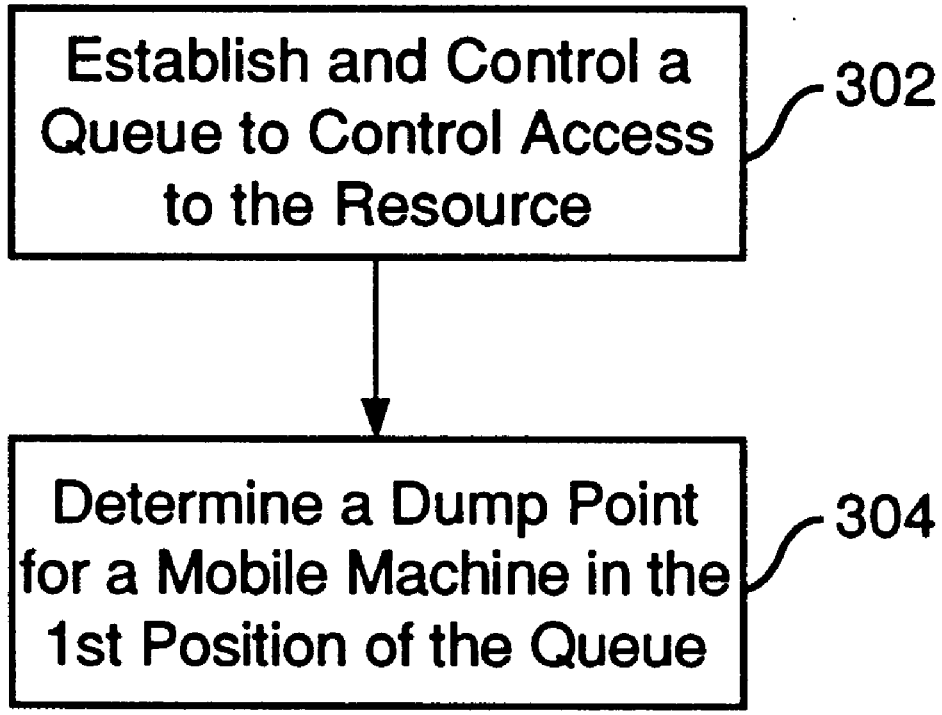
FIG. 3 is a high level flow diagram illustrating a method of the present invention.

A method of managing the resource 202, according to one embodiment of the present invention, is illustrated in FIG. 3. In a first control block 302, the resource manager 104 establishes and controls a queue 216 corresponding to the entry point 204 in order to control access to the resource 202. In a second control block 304, the resource manager 104 determines a dump point 210 for the first mobile machine 106 in the queue 216.

Industrial Applicability

With reference to the drawings and in operation, the present invention provides a system and method for managing access to a resource 202 having a stop point 210, such as a dump point, by at least one mobile machine. In the preferred embodiment, during initialization, the resource manager 104 accesses a database containing the information regarding the configuration of the resource 202. For example, referring again to FIG. 2, the resource manager 104 determines that the resource 202 has one entry point 204, one exit point 206, one dump row 208, and one dump point 210 on the dump row 208. Based on this information, the resource manager 104 establishes a queue 216 for the entry point 204. As a mobile machine 106 approaches the resource 202, it sends a queue position request signal to the resource manager 104. The resource manager 104 determines and sends a queue position signal to the mobile machine 106. The queue position signal will contain data disclosing the physical location of the first position, e.g., the entry point 204 in the queue 216, and a determination of the number of mobile machines 106 currently in the queue 216, e.g., zero. The queue manager 102 on the mobile machine 106 will use the information contained in the queue position signal to determine where to stop the mobile machine 106 to await further instructions from the resource manager 104.

The resource manager 104 then determines the location of the first future dump point 212. The location of the first future dump point 212 includes the heading and position of the mobile machine 106 when it is located at the dump point 210. In the preferred embodiment, the location of the first future dump point 212 is based on the location of the dump point 210 plus an incremental offset. In the preferred embodiment, once the resource manager 104 determines the first future dump point 212, it will then determine a route to the first future dump point 212. The first future dump point 212, and the route to the first future dump point 212 are then communicated to the first mobile machine 106 in the queue 216.

The resource manager 104 will then determine when the first future dump point 212 and the dump row 208 are available to receive the next mobile machine 106. For example, this determination is based on a prior mobile machine 106 being finished dumping at the dump point 210, and having left the dump row 208. The resource manager 104 is able to track the progress of mobile machines 106 in the resource 202 by a series of communications which will be described below.

Once the resource manager 104 determines that the first future dump point 212 and dump row 208 are clear, it sends a depart queue position signal to the mobile machine 106 in the first position of the queue 216. The mobile machine 106 responsively sends a leave queue position signal to the resource manager 104 and moves to the first future dump point 212. The resource manager 104 may now determine if any other mobile machines 106 can access the resource 202 without conflicting with the mobile machine 106. Since the resource 202 depicted in FIG. 2 has only one dump row 208, other mobile machines 106 may not simultaneously access the resource 202.

After arriving at the first future dump point 212, the mobile machine 106 will send an arrive signal to the resource manager 104. The mobile machine 106 then begins to dump. After completion of dumping at the first future dump point 212 the mobile machine 106 sends a dump complete signal to the resource manager 104. The resource manager 104 will responsively determine when the route is clear from the first future dump point 212 to the exit point 206. When the resource manager 104 determines the route is clear, it sends a depart dump point signal to the mobile machine 106. The mobile machine 106 sends a leave dump point signal to the resource manager 104, and then leaves the first future dump point 212. When the mobile machine 106 exits the dump row 208, it sends a leave dump row signal to the resource manager 104. When the mobile machine 106 leaves the resource 202, e.g., passes the exit point 206, it sends the resource manager 104 a leave resource signal.

When the resource manager 104 receives the leave dump point signal it determines a second future dump point 214 for the next mobile machine 106 to access in the dump row 208. The resource manager 104 also determines the route to the second future dump point 214, and communicates this information to the next mobile machine 106 in the queue 216. When the resource manager 104 receives the leave dump row signal from the mobile machine 106, it sends the next mobile machine 106 in the queue 216 to the second future dump point 214.

Figure 4:
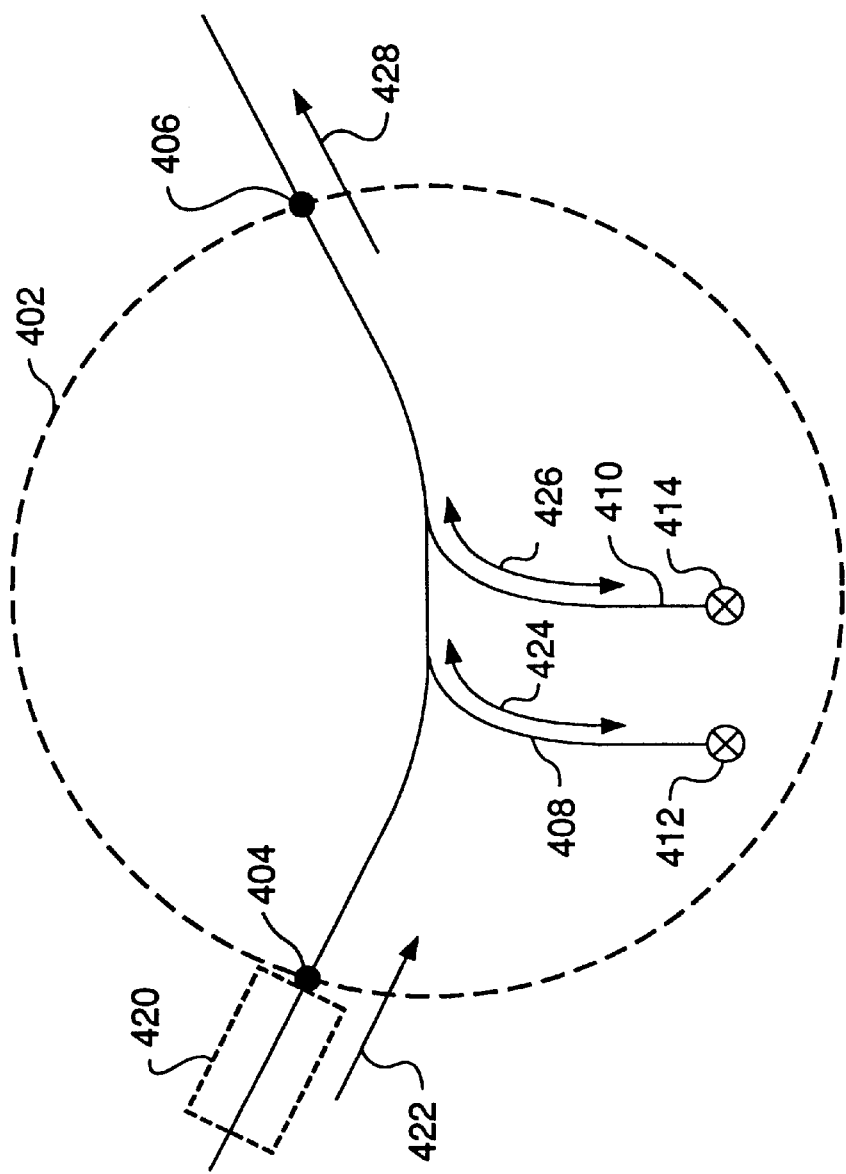
FIG. 4 is a diagrammatic illustration of a windrow dump having one entry point, two dump rows, two dump points and one exit point.

The present invention can be used to manage dump resources with more complex configurations. For example, in FIG. 4, a windrow dump 402 has a first and a second windrow 408,410 and a first and a second dump point 412,414 corresponding to the first and the second windrows 408,410 respectively. The windrow dump 402 also has an entry point 404, an exit point 406, and a queue 416. Arrows 422,424,426,428 indicate the direction of travel through the windrow dump 402. The configuration of the windrow dump 402 will enable multiple mobile machines 106 to simultaneously access the first and the second dump points 412,414 as long as the routes to and from the respective dump points 412,414 do not conflict with each other.

When the resource manager 104 receives a leave resource signal from a first mobile machine 106 at the first dump point 412, it can then permit a second mobile machine at the second dump point 414 to exit the windrow dump 402.

Figure 5:
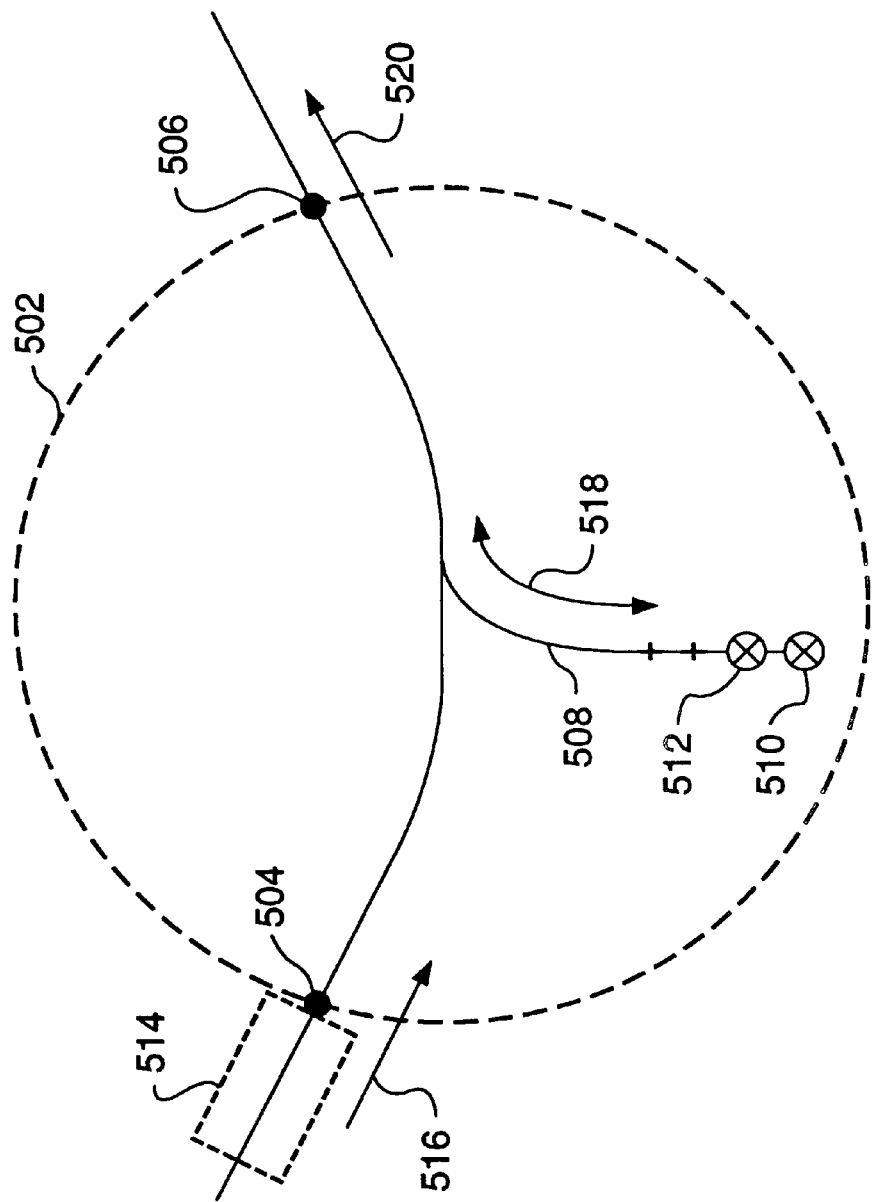
FIG. 5 is a diagrammatic illustration of a windrow dump having one entry point, one dump row, two dump points, and one exit point.

With reference to FIG. 5, the present invention may also be used to control access to a windrow dump 502 having a first and a second dump point 510,512. The windrow dump 502 has an entry point 504, an exit point 506, a queue 514, and one dump row 508 having the first and the second dump point 510,512. Arrows 516,518,520 indicate the direction of travel through the windrow dump 502. Multiple mobile machines 106 may simultaneously access the first and second dump points 510,512 as long as the routes to and from the first and second dump points 510,512 do not conflict with each other. For example, a first mobile machine 106 attempting to enter the windrow dump 502 to access the first dump point 510 would conflict with a second mobile machine 106 attempting to leave the second dump point 512.

Another example of a progressive dump resource which the present invention can manage is a high wall dump resource. With reference to FIG. 6, a high wall dump 602 has an entry point 604, an exit point 606, a dump row 608, and a dump point 610. Arrows 616,618,620 indicate the direction of travel within the high wall dump 602. The high wall dump 602 also has a high wall 622, such as a ledge or ravine, which the dumped material can be pushed into. The high wall dump 602 may have an earthmoving machine 612 which the resource manager 104 manages. One method of managing the earthmoving machine 612 is that once a mobile machine 106 has completed dumping at the dump point 610, and has left the dump point 610, the resource manager 104 sends a dump point ready signal to the earthmoving machine 612. The earthmoving machine 612 responsively begins pushing the dumped material over the high wall 622. When the earthmoving machine 612 is finished working at dump point 610, it sends a completed dump point signal to the resource manager 104. When the earthmoving machine 612 is ready to work on the dump point 610 it sends an earthmoving machine ready signal to the resource manager 104. The resource manager 104 responsively sends the dump point ready signal to the earthmoving machine 612 after a next mobile machine 106 has completed a dump and has left the dump point 610.

The invention has been described in the environment of an autonomous mining system. The resource manager 104 is responsible for controlling traffic throughout the mining system. Queues are set up and managed by the resource manager 104 to control mobile machine access to dump points. As will be apparent to a person skilled in the relevant art, however, the invention may be used to manage a shared resource in other environments. For example, access to a site in a warehouse may be controlled by a resource manager.

While the invention has been particularly shown and described with reference to several preferred embodiments thereof, it will be understood by those skilled in the art that various changes in form and details may be made therein without departing from the spirit and scope of the invention.

Other aspects, objects, and features of the present invention can be obtained from a study of the drawings, the disclosure, and the appended claims.

We claim:

1. A system for managing at least one mobile machine at a resource, comprising:
    a stop point located in said resource, said stop point being a function of a configuration of said resource;
    a queue manager located on each of said at least one mobile machine, said queue manager being adapted to generate a queue position request signal in response to said mobile machine approaching said resource; and
    a resource manager adapted to establish and control a queue to control access to said resource in response to receiving said queue position request signal, said resource manager also being adapted to determine said stop point for said each of said at least one mobile machine in a first position of said queue.

2. A system, as set forth in claim 1, wherein said resource manager is adapted to determine a queue position in response to said queue position request signal.

3. A system, as set forth in claim 1, wherein said resource manager is adapted to determine a route to said stop point.

4. A system, as set forth in claim 3, wherein said resource manager is adapted to communicate said route to a first mobile machine in said queue.

5. A system, as set forth in claim 1, wherein said resource manager is adapted to allow said first mobile machine of said queue to access said stop point in response to a condition of said resource.

6. A system, as set forth in claim 2, wherein said resource manager is adapted to deliver a queue position signal to said approaching mobile machine, said queue position signal including data disclosing a resource position and a determination of a number of mobile machines in said queue, and to determine said queue position in response to said queue position signal.

7. A system, as set forth in claim 1, wherein said resource manager is adapted to selectively produce a blocking signal to prevent mobile machines in said queue from accessing said resource.

8. A system, as set forth in claim 1, wherein said resource manager is adapted to determine said configuration of said resource.

9. A system, as set forth in claim 1, wherein said resource is a dump resource, and said stop point is a dump point.

10. A system, as set forth in claim 9, wherein said dump resource includes a dump row, an entry point, an exit point, and said dump point.

11. A system, as set forth in claim 9, wherein said dump resource includes a first dump row and a second dump row.

12. A system, as set forth in claim 11, wherein a first mobile machine and a second mobile machine simultaneously access said first and second dump rows, respectively.

13. A system, as set forth in claim 10, wherein said resource manager is adapted to provide communications between said resource manager and an earthmoving machine.

14. A system, as set forth in claim 13, wherein said resource manager is adapted to send a dump point ready signal to said earthmoving machine, said dump point ready signal including data disclosing said dump point.

15. A system, as set forth in claim 9, wherein said dump resource is a high wall dump.

16. A system, as set forth in claim 9, wherein said dump resource is a windrow dump.

17. A method for managing a resource shared by at least one mobile machine, including the steps of:
    establishing and controlling a queue to control access to said resource; and determining a stop point in said resource for a mobile machine in a first position of said queue, said stop point being a function of a configuration of said resource.

18. A method, as set forth in claim 17, including the step of communicating said stop point to a first mobile machine in said queue.

19. A method, as set forth in claim 17, including the step of determining the configuration of said resource.

20. A method, as set forth in claim 17, wherein establishing and controlling a queue includes the steps of:

receiving a queue position request signal from a mobile machine approaching said resource;

responsively determining a queue position in said queue; and communicating said queue position to said approaching mobile machine.

21. A method, as set forth in claim 20, wherein responsively determining a queue position includes determining said queue position as a function of an entry point in said resource, and a determination of the number of mobile machines in said queue.

22. A method, as set forth in claim 17, including the steps of:

determining a route to said stop point; and communicating said route to a mobile machine in a first position of said queue.

23. A method, as set forth in claim 17, including the step of allowing said mobile machine in said first position of said queue to access said stop point in response to a condition of said resource.

24. A method, as set forth in claim 17, including the steps of:

communicating a depart position signal to said mobile machine in said first position of said queue in response to allowing said mobile machine to access said stop point;

receiving a leave position signal from said mobile machine as a first mobile machine departs from said first position of said queue; and responsively updating the positions of any remaining mobile machines in said queue.

25. A method, as set forth in claim 17, including the step of receiving an arrive signal from said mobile machine in response to said mobile machine arriving at said stop point.

26. A method, as set forth in claim 17, including the steps of:

receiving an access completed signal from said mobile machine located at said stop point;

responsively generating and communicating a depart stop point signal to said mobile machine;

receiving a leave stop point signal from said mobile machine; and receiving a leave resource signal in response to said mobile machine leaving said resource.

27. A method, as set forth in claim 26, wherein responsively generating and communicating said depart stop point signal includes the step of communicating said depart stop point signal to said mobile machine in response to the availability of the route between said stop point and an exit point of said resource.

28. A method, as set forth in claim 19, wherein the configuration of said resource is determined to be a dump resource.

29. A method, as set forth in claim 26, including the step of receiving a leave dump row signal in response to said mobile machine leaving said dump row.

30. A method, as set forth in claim 28, including the step of communicating a dump point ready signal to an earthmoving machine.

31. A method, as set forth in claim 30, including the steps of:

receiving an earthmoving machine ready signal from said earthmoving machine; and communicating a dump point ready signal to said earthmoving machine.

32. A method, as set forth in claim 31, including the steps of:

determining an earthmoving machine route to a dump point for said earthmoving machine, said dump point corresponding to said stop point; and determining if said earthmoving machine route is clear.

33. A method, as set forth in claim 30, including the steps of:

receiving a finished earthmoving signal from said earthmoving machine;

responsively determining an earthmoving point; and communicating said earthmoving point to said earthmoving machine.

34. A method, as set forth in claim 20, wherein communicating said queue position includes the steps of:

communicating an entry point position to said approaching mobile machine, said entry point position being a function of said queue and the number of mobile machines in said queue; and determining said queue position as a function of said entry point position.

35. A method, as set forth in claim 17, including the step of determining a second stop point position as a function of a first stop point position and an incremental offset from said first stop point position.

* * * * *